(12) United States Patent
McDonald et al.

(10) Patent No.: US 8,977,837 B2
(45) Date of Patent: Mar. 10, 2015

(54) APPARATUS AND METHOD FOR EARLY ISSUE AND RECOVERY FOR A CONDITIONAL LOAD INSTRUCTION HAVING MULTIPLE OUTCOMES

(75) Inventors: Robert Gregory McDonald, Austin, TX (US); Paul Gilbert Meyer, Bee Cave, TX (US)

(73) Assignee: ARM Limited, Cambridge (GB)

( * ) Notice: Subject to any disclaimer, the term of this patent is extended or adjusted under 35 U.S.C. 154(b) by 1023 days.

(21) Appl. No.: 12/453,938

(22) Filed: May 27, 2009

(65) Prior Publication Data

US 2010/0306504 A1 Dec. 2, 2010

(51) Int. Cl.
*G06F 9/312* (2006.01)
*G06F 9/38* (2006.01)
*G06F 9/30* (2006.01)

(52) U.S. Cl.
CPC ............ *G06F 9/3861* (2013.01); *G06F 9/3001* (2013.01); *G06F 9/30043* (2013.01); *G06F 9/30072* (2013.01); *G06F 9/3863* (2013.01)
USPC ............................ 712/216; 712/214; 712/225

(58) Field of Classification Search
CPC ............ G06F 9/30043; G06F 9/30072; G06F 9/3824; G06F 9/3832; G06F 9/3838; G06F 9/3842; G06F 9/3861
USPC .................................. 712/219, 214, 216, 225
See application file for complete search history.

(56) References Cited

U.S. PATENT DOCUMENTS

| | | | | |
|---|---|---|---|---|
| 5,469,551 A | * | 11/1995 | Sites et al. ..................... | 712/239 |
| 5,828,868 A | * | 10/1998 | Sager et al. .................... | 713/501 |
| 6,163,839 A | * | 12/2000 | Janik et al. ..................... | 712/219 |
| 6,205,542 B1 | * | 3/2001 | Grochowski et al. ......... | 712/219 |
| 6,230,258 B1 | * | 5/2001 | Takayama et al. ............. | 712/226 |
| 6,487,575 B1 | * | 11/2002 | Oberman ....................... | 708/504 |
| 6,901,104 B1 | * | 5/2005 | Du et al. ......................... | 375/142 |
| 6,950,925 B1 | * | 9/2005 | Sander et al. .................. | 712/215 |
| 7,290,121 B2 | * | 10/2007 | Kromer .......................... | 712/219 |
| 7,380,111 B2 | * | 5/2008 | Grochowski et al. ......... | 712/239 |
| 7,631,207 B1 | * | 12/2009 | Song et al. ..................... | 713/320 |
| 2004/0153763 A1 | * | 8/2004 | Grochowski et al. ........... | 714/17 |

OTHER PUBLICATIONS

Pentium Pro Family Developer' Manual vol. 2: Programmer's Reference Manual , Intel Corporation, 1996.*
Speculative Execution based on Value Prediction, Freddy Gabbay, Nov. 1996.*

* cited by examiner

*Primary Examiner* — David J Huisman
(74) *Attorney, Agent, or Firm* — Nixon & Vanderhye P.C.

(57) ABSTRACT

At least one instruction of a sequence of program instructions has a plurality of alternative outcomes including at least a first outcome that is independent of at least one operand and a second outcome that is dependent on the at least one operand. The at least one operand is a value generated by a preceding instruction in the sequence. The at least one instruction is issued for execution independently of when the at least one operand is generated by the preceding instruction. Recovery circuitry is provided to perform a recovery operation in the event that the second outcome is to be executed for the at least one instruction and the at least one operand has not been generated by the preceding instruction when the at least one instruction is to be executed by said instruction execution circuitry.

17 Claims, 4 Drawing Sheets

| instruction | | latency | sources |
|---|---|---|---|
| ADD | r1, r1, #64 | 1 cycle | R1 |
| CMP | r7, #0 | 1 cycle | R7 |
| LDREQ | r0, [r1, #4] | 4 cycles | COND, R1, R0 |
| LDRNE | r0, [r1, #8] | 4 cycles | COND, R1, R0 |
| SUB | r8, r8, r0 | 1 cycle | R8, R0 |

| instruction | latency | sources |
|---|---|---|
| ADD r1, r1, #64 | 1 cycle | R1 |
| CMP r7, #0 | 1 cycle | R7 |
| LDREQ r0, [r1, #4] | 4 cycles | COND, R1, R0 |
| LDRNE r0, [r1, #8] | 4 cycles | COND, R1, R0 |
| SUB r8, r8, r0 | 1 cycle | R8, R0 |

FIG. 3

| Cycle | ALU pipe | LD/ST pipe |
|---|---|---|
| 1 | ADD | |
| 2 | CMP | |
| 3 | | LDREQ |
| 4 | | |
| 5 | | |
| 6 | | |
| 7 | | LDRNE |
| 8 | | |
| 9 | | |
| 10 | | |
| 11 | SUB | |

FIG. 4

| Cycle | ALU pipe | LD/ST pipe |
|---|---|---|
| 1 | ADD | |
| 2 | CMP | |
| 3 | | LDREQ |
| 4 | | LDRNE |
| 5 | | |
| 6 | | |
| 7 | | |
| 8 | SUB | |

FIG. 5

LDR   r2, [r4, #2]
MUL   r1, r2, r3

FIG. 6

APPARATUS AND METHOD FOR EARLY ISSUE AND RECOVERY FOR A CONDITIONAL LOAD INSTRUCTION HAVING MULTIPLE OUTCOMES

BACKGROUND OF THE INVENTION

1. Field of the Invention

This invention relates to the field of data processing. In particular, the invention relates to dynamic scheduling of instructions in a data processing apparatus.

2. Description of the Prior Art

Processors that employ dynamic scheduling and out-of-order execution techniques are known. In such processors, instructions are queued and dynamically selected for issue once their source operands have become available for processing. This involves identifying source operands, performing register renaming in order to avoid data hazards, queuing the instructions, updating instruction status as individual results from preceding instructions are produced, selecting one or more instructions from the queue to issue for execution and controlling forwarding of results between pipelined instructions. Instructions are not issued until the values of all their source operands have become available for processing. Sometimes issuing of an instruction has to be delayed for several processing cycles while a preceding instruction calculates a value of an operand. This reduces the processing speed of the processor.

Some in-order processors use scoreboard-based scheduling techniques to reduce the delay. Some instructions are executed in multiple processing cycles by a sequence of execute pipeline stages, and may not require some operands to be available until one of the later stages. If, for example, a particular operand is not needed until the $N^{th}$ cycle then the instruction could be issued such that execution begins N cycles before the result is predicted to be produced by a preceding instruction. Scoreboard-based scheduling requires the system to monitor a large amount of state information associated with pending instructions and would require additional hardware for tracking both the progress of an instruction being executed and the availability of results of preceding instructions. This complex circuitry would not be practical in out-of-order processors, since the number of currently pending instructions which need to be monitored is much larger than for an in-order processor. The present invention seeks to provide a way of reducing scheduling latency without requiring this additional complexity.

SUMMARY OF THE INVENTION

Viewed from one aspect the present invention provides an apparatus for processing data under control of a sequence of program instructions, said apparatus comprising:

an instruction decoder for decoding said instructions to generate decoded instructions, said program instructions including at least one instruction having a plurality of alternative outcomes, said alternative outcomes including at least a first outcome that is independent of at least one operand and a second outcome that is dependent on said at least one operand, said at least one operand being generated by a preceding instruction of said sequence of program instructions;

instruction issuing circuitry for issuing said decoded instructions for execution, said instruction issuing circuitry being configured to issue a decoded instruction corresponding to said at least one instruction independently of when said at least one operand is generated by said preceding instruction;

instruction execution circuitry for executing said decoded instructions issued by said instruction issuing circuitry; and recovery circuitry for performing a recovery operation in the event that said second outcome is to be executed for said at least one instruction and said at least one operand has not been generated by said preceding instruction when said decoded instruction corresponding to said at least one instruction is to be executed by said instruction execution circuitry.

The present technique recognizes that there are some types of instructions for which it is not necessary to wait for source operands to become available, or determine at what point in the future those operands will become available, before issuing the instruction. This class of instructions includes at least one instruction having a plurality of alternative outcomes. Which of the alternative outcomes is actually executed can depend on values of various operands or condition codes, or on the current state of the processor. The alternative outcomes include at least a first outcome that is independent of at least one operand of the instruction and a second outcome that is dependent on the at least one operand. If execution of the at least one instruction results in the first outcome, then the value of the at least one operand will not be required and so there is no need to obtain the result of a preceding instruction that generates that operand. The at least one instruction may therefore be issued independently of when the at least one operand is generated by the preceding instruction. If the first outcome is executed, or the second outcome is executed once the at least operand is already available, then the delay associated with waiting for all the operands to be available can be avoided. Recovery circuitry is provided to perform a recovery operation if the second outcome is executed and the value of the operand is not available. The recovery circuitry resolves the potential data hazard and ensures that the correct outcome is produced. The present technique avoids the requirement for hardware for tracking when operands are generated because data hazards will not arise if the first outcome is executed; and the hazards can be resolved in time for execution of the instruction, or recovered from by the recovery circuitry, if the second outcome is executed.

One type of instruction to which the present technique may be applied is a conditional instruction. The conditional instruction controls the instruction execution circuitry to select one of the alternative outcomes for execution in dependence upon whether or not a condition associated with the conditional instruction is satisfied. For one of the outcome when the condition is satisfied and the outcome when the condition is not satisfied, the at least one operand is not required to obtain a result. If on execution the outcome that is independent of the at least one operand is selected then latency will be reduced because the instruction has issued without waiting for the operand to become available. In the scenario where the outcome that is dependent upon the at least one operand is executed, then a recovery operation can be performed if needed. Although there is a latency associated with performing a recovery operation, for some conditional instructions the outcome independent of the at least one operand has a higher probability of occurring than the outcome which is dependent upon the at least one operand, and so the average number of cycles for issuing and processing the instruction several times can be reduced.

Although it will be appreciated that any conditional instruction is suitable for the present technique, one particular example of the at least one instruction is a conditional load instruction that controls the instruction execution circuitry to load a value to a destination register if the condition is satisfied. If the condition is not satisfied, then the destination register will continue to store a value previously stored in the register. As operands, the conditional load instruction will include at least an operand identifying a value stored in the destination register prior to execution of the instruction and one or more values used to obtain the value to be loaded to the destination register if the condition is satisfied. The value stored in the destination register prior to execution of the load instruction is treated as a source operand because it will be used in the event that the condition code fails. Any of the operands of the conditional load instruction can represent the at least one operand.

When the at least one operand is the value stored in the destination register prior to execution of the conditional load instruction, then the first outcome (which is independent of the at least one operand) is the outcome executed if the condition is satisfied in order to load the value to the destination register, and the second outcome (which is dependent on the at least one operand) is the outcome executed if the condition is not satisfied in order to retain the existing value of the destination register.

On the other hand, when, for the conditional load instruction, the at least one operand is a value used to obtain the value to be loaded to the destination register if the condition is satisfied, then the first outcome (which is independent of the at least one operand) is the outcome executed if the condition is not satisfied in order to retain the existing value of the destination register, and the second outcome (which is dependent on the at least one operand) is the outcome executed if the condition is satisfied in order to load the value to the destination register.

Thus, with a conditional load instruction, no matter which outcome is actually executed, there will be at least one operand that is not be required to execute that outcome, and so this means that for conditional load instructions the scheduling latency can be reduced by issuing the instruction independently of the timings at which the operands are generated by preceding instructions and without waiting for the operands to become available.

Another type of instruction to which the present technique may be applied is a multiply instruction for controlling the instruction execution circuitry to multiply a first operand by a second operand. If one of these operands (for example, the first operand) has a value of zero, then the result of executing the multiply instruction will be independent of the value of the second operand as the result will be zero regardless of the value of the second operand. On the other hand, when the first operand does not have a value of zero, then the answer will be dependent upon both the first operand and the second operand. Thus, issuing the multiply instruction without waiting for all the operands to become available means that when the first outcome occurs (i.e. the first operand has a value of zero), then the second operand will be unnecessary and hence the scheduling latency is reduced by not waiting for the value of the second operand to be calculated by a preceding instruction. When the first operand does not have a value of zero, then the value of the second operand is required and so if this is not ready in time for execution of the instruction, then a recovery operation is performed.

In one feature of the present technique, the preceding instruction is an instruction for which the corresponding decoded instruction is executed in a plurality of processing cycles by the instruction execution circuitry. The greater the number of cycles required for executing the preceding instruction, the greater the reduction in the number of cycles required to process the sequence of instructions.

The recovery circuitry may be configured to perform the recovery operation by controlling the instruction issuing circuitry to reissue the decoded instruction corresponding to the at least one instruction. Thus, the recovery circuitry functions as a replay mechanism that restarts the execution of the instruction in order to avoid a data hazard. A replay mechanism is simpler to implement and requires less hardware than systems that guarantee ahead of execution that no hazards will occur.

An alternative to replaying an instruction is to perform a recovery operation by stalling execution of decoded instructions by the instruction execution circuitry until the at least one operand has been generated by the preceding instruction. Although stalling the execution of instructions results in a delay, this delay will be of a similar length to the delay that would have occurred if the issuing circuitry had waited for the operand to become available before issuing the instruction. Since the performance is improved if the first outcome is executed and there is only a small performance penalty when the second outcome is executed then the overall processing speed of a sequence of instructions is improved. However, stalling may block use of the pipeline for other instructions until the stall is cleared.

The present technique is applicable to out-of-order processors in which the instruction issuing circuitry is configured to schedule the execution order of the sequence of instructions dynamically. The execution order will not necessarily be the same as the order of the sequence of instructions as the instruction issuing circuitry will select queued instructions for issue so as to reduce the number of cycles required to execute all the instructions.

In another feature of the present technique, the instructions include register specifiers for identifying registers, the at least one operand being a value stored in a register specified by at least one of the register specifiers. Thus, the word "operand" is used to mean the data value processed by the instruction rather than the register specifier specified in the instruction itself.

Viewed from another aspect, the present invention provides an apparatus for processing data under control of a sequence of program instructions, said apparatus comprising:

instruction decode means for decoding said instructions to generate decoded instructions, said program instructions including at least one instruction having a plurality of alternative outcomes, said alternative outcomes including at least a first outcome that is independent of at least one operand and a second outcome that is dependent on said at least one operand, said at least one operand being generated by a preceding instruction of said sequence of program instructions;

instruction issuing means for issuing said decoded instructions for execution, said instruction issuing means being configured to issue a decoded instruction corresponding to said at least one instruction independently of when said at least one operand is generated by said preceding instruction;

instruction execution means for executing said decoded instructions issued by said instruction issuing means; and recovery means for performing a recovery operation in the event that said second outcome is to be executed for said at least one instruction and said at least one operand has not been generated by said preceding instruction when said decoded instruction corresponding to said at least one instruction is to be executed by said instruction execution means.

Viewed from yet another aspect, the present invention provides a method for processing data under control of a sequence of program instructions, said method comprising steps of:

decoding said instructions to generate decoded instructions, said program instructions including at least one instruction having a plurality of alternative outcomes, said alternative outcomes including at least a first outcome that is independent of at least one operand and a second outcome that is dependent on said at least one operand, said at least one operand being generated by a preceding instruction of said sequence of program instructions;

issuing said decoded instructions for execution, a decoded instruction corresponding to said at least one instruction being issued independently of when said at least one operand is generated by said preceding instruction;

executing said decoded instructions issued in said issuing step; and performing a recovery operation in the event that said second outcome is to be executed for said at least one instruction and said at least one operand has not been generated by said preceding instruction when said decoded instruction corresponding to said at least one instruction is to be executed by said executing step.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
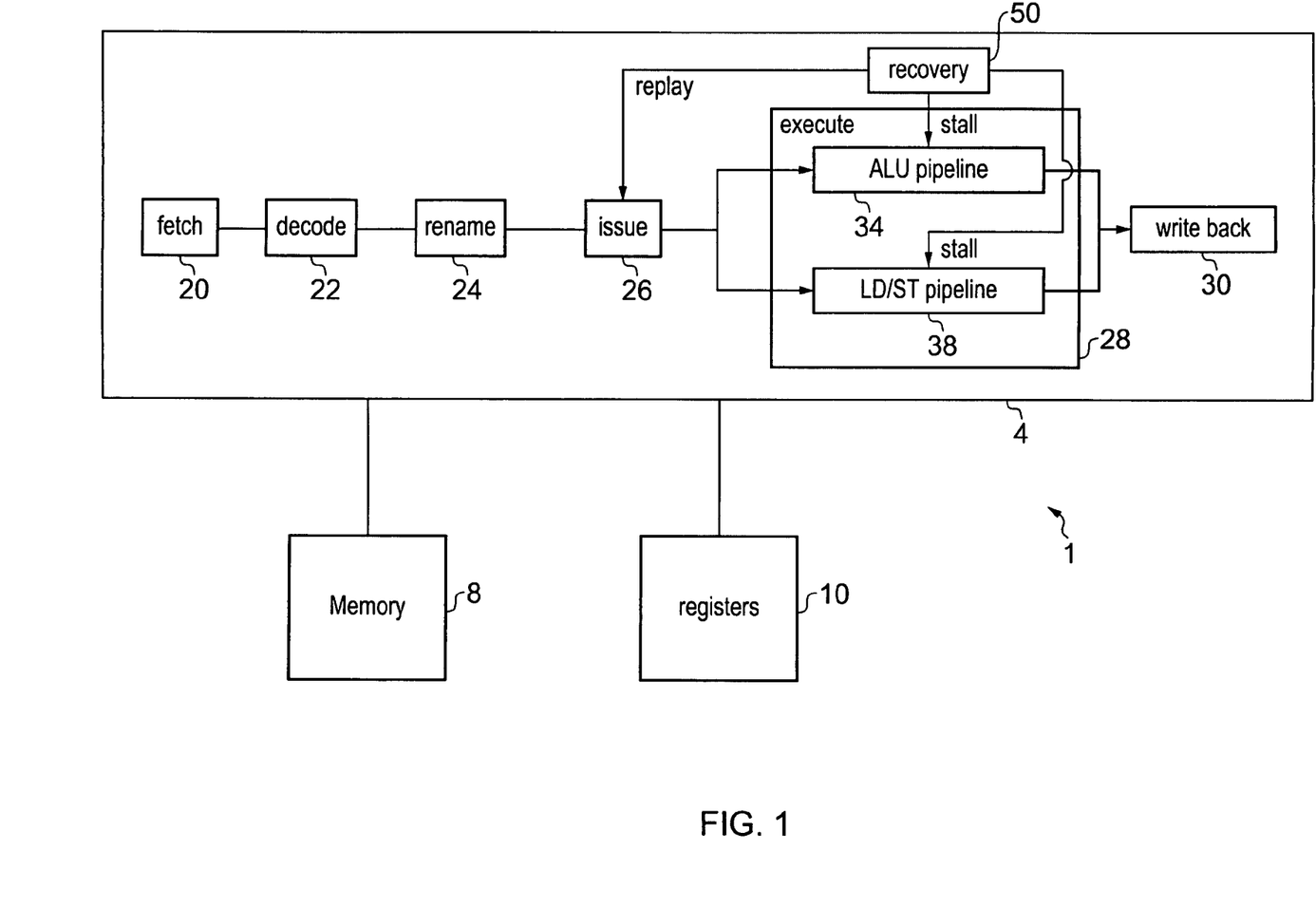
FIG. 1 schematically illustrates a processor employing dynamic scheduling of instructions.

FIG. 1 shows a processor 1 that employs dynamic scheduling of instructions. Various elements of FIG. 1 will be described below, although it will be appreciated that the processor 1 will also include other elements and features that have not been illustrated for clarity.

The processor 1 includes a processing pipeline 4 coupled to a memory 8, and a bank of registers 10. The processing pipeline 4 processes sequences of instructions stored in the memory 8. Instructions processed by the processing pipeline 4 contain register specifiers identifying one or more registers within the register bank 10 which contain values that are to be used as operands for the instructions. The processing pipeline 4 comprises a fetch stage 20 for fetching instructions from the memory 8; a decode stage 22 for decoding the instructions fetched from memory and generating decoded instructions; a rename stage 24 for renaming registers specified in the decoded instructions so as to avoid data hazards (such as read-after-write or write-after-write hazards); an issue stage 26 for issuing decoded instructions for execution; an execute stage 28 for executing decoded instructions; and a write back stage 30 for writing back results of executed instructions to the register file 10.

The execute stage 28 includes an ALU execution pipeline 34 for performing arithmetic or logical operations; and a load/store (LD/ST) execution pipeline 38 for loading data values from memory 8 or storing data values to memory 8. Although two execution pipelines 34, 38 have been illustrated in FIG. 1, it will be appreciated that further execution pipelines could be provided in the execution stage 28, each execution pipeline executing instructions in parallel to one another.

The issue stage 26 of the pipelines schedules the order and timings with which the instructions are issued to the execute stage 28 in order to achieve an improved processing throughput of the pipeline. Sometimes, an instruction being processed by the pipeline uses an operand value that is generated by a preceding instruction in the sequence of instructions being executed. The issue stage 26 could wait for the value of the operand to be generated by the preceding instruction before issuing the instruction to the execute stage 28. However, for some types of instructions, the issue stage 26 does not wait until the value of the operand is generated before issuing the instruction for execution. For these predetermined types of instruction, there are several alternative outcomes including at least one outcome in which the operand is not required in order to produce a result. Issuing these instructions without waiting for the operand to be calculated can reduce the latency associated with that instruction since the instruction can at least start to be executed without the operand being available for processing.

As a result of issuing instructions without determining whether or not the operands are already available and independently of when the operands will be generated, it is possible that when the instruction reaches one of the execute pipelines 34, 38 the value of the operand is not ready. Therefore, recovery circuitry 50 is provided to perform a recovery operation so as to ensure that the instructions produce the correct result. The recovery operation can be to replay the instruction by controlling the issue stage 26 to reissue the instruction for execution. Alternatively, the recovery circuitry 50 can perform a recovery operation by stopping execution of decoded instructions by one of the execute pipelines 34, 38 until the value of the operand becomes available.

Figure 2:
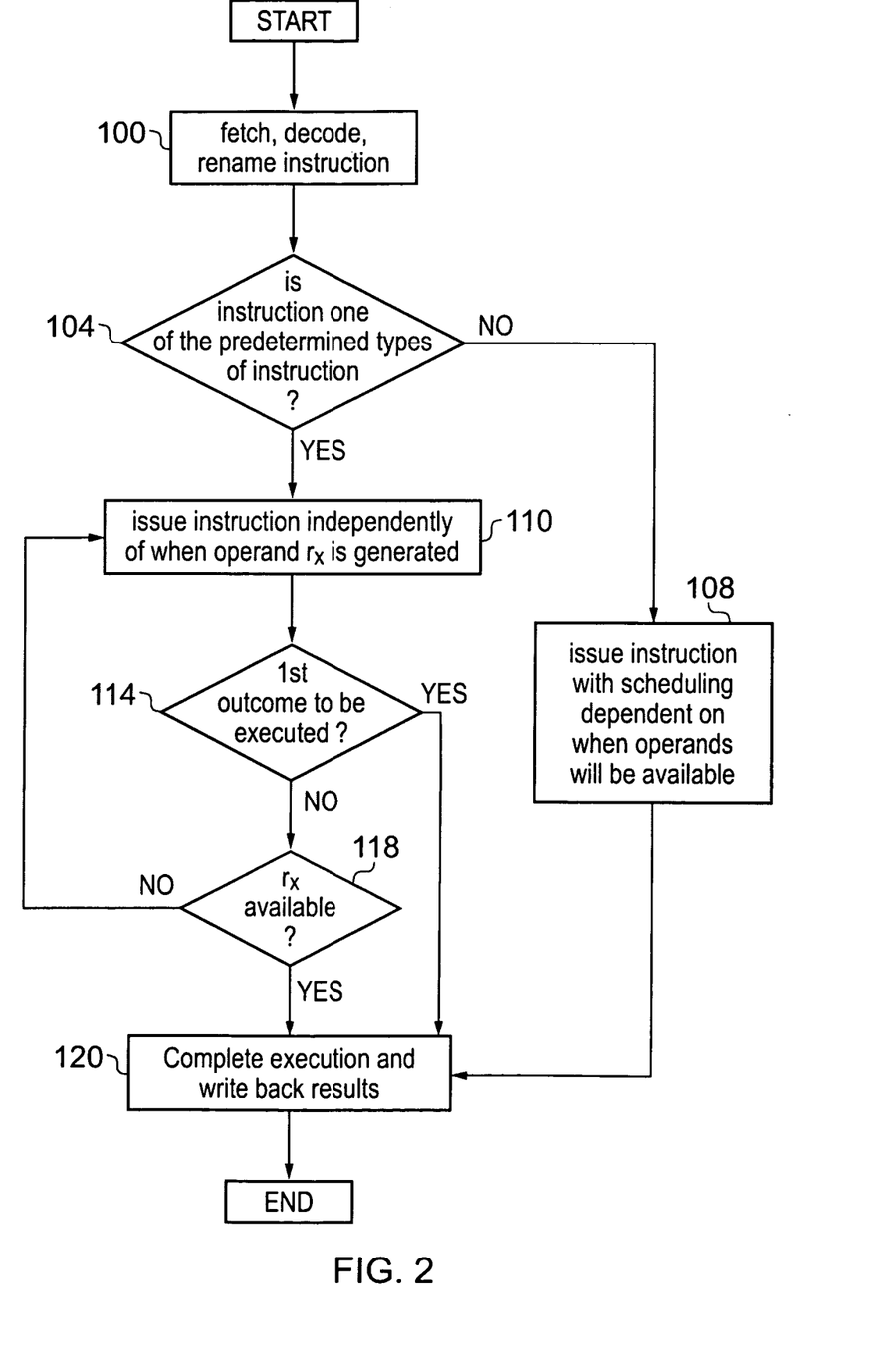
FIG. 2 shows a method of processing instructions in a processor employing dynamic scheduling.

FIG. 2 illustrates a process by which the pipeline 4 processes a program instruction. It should be noted that although in FIG. 2 the steps are shown in a particular order, some of the steps may be performed in parallel to one another. Also, in the pipeline 4 each of the stages operates simultaneously to process different instructions, so that while, for example, one instruction is being decoded by the decode stage 22, another instruction is being renamed at the rename stage 24, yet another instruction is being issued by the issue stage 26, and so on. Thus, many of the steps of FIG. 2 will actually be performed at the same time for different instructions in the pipeline.

The processing of an instruction starts at step 100 in which the instruction is fetched from the memory 8 by the fetch stage 20 and decoded by the decode stage 22 in order to generate a decoded instruction. The instruction also undergoes register renaming in the rename stage 24, which maps register specifiers specified in the instruction to physical registers in the register bank 10. Flow then proceeds to step 104 in which it is determined whether the instruction is one of the predetermined types of instruction. Examples of the predetermined types of instruction will be described below with reference to FIGS. 3 to 6. The predetermined types of instruction each have several alternative processing outcomes, one of which will be selected for execution when the instruction is executed at the execute stage 28. The alternative outcomes include at least a first outcome in which the result of the instruction is independent of an operand $r_x$ of the instruction, and a second outcome in which the result is dependent upon operand $r_x$. If it is determined that the instruction is not one of the types of predetermined instructions, then flow proceeds to step 108 where the instruction is issued with a scheduling dependent upon when the operands of the instruction are available. This may involve waiting until the operand values are generated by a preceding instruction in the sequence. Having issued the instruction, the instruction is then executed and the result(s) written back to the register file 10 in step 120.

On the other hand, if at step 104 it is determined that the instruction being processed is one of the predetermined types of instruction, then flow proceeds to step 110 at which the instruction is issued by the issue stage 26 to the execute stage 28 independently of when the operand $r_x$ is generated. The issue stage 26 issues the instruction without waiting for operand $r_x$ to be generated and without determining at what cycle in the future the operand $r_x$ is likely to be available. If the instruction is an arithmetic/logical instruction then it is issued to the ALU pipeline 34, and if the instruction is a load/store instruction then it is issued to the LD/ST pipeline 38.

Next, at step 114 the one of the execution pipelines 34, 38 that is processing the instruction determines whether or not the outcome to be executed is the first outcome. If the first outcome is to be executed then flow proceeds to step 120 where execution of the instruction is completed and the result (s) of the instruction are written back to the registers 10 by the write back stage 30. When the first outcome is executed, it does not matter whether or not the value of the operand $r_x$ has been generated by the preceding instruction as the first outcome is independent of the value of $r_x$.

Alternatively, if at step 114 it is determined that the second outcome is to be executed, then at step 118 it is determined whether or not the value of operand $r_x$ is available for processing. If the operand $r_x$ has already been generated by the preceding instruction then it is available and so the instruction can be executed at step 120. However, if the operand $r_x$ is not yet available then a recovery operation will need to be performed by the recovery circuitry 50. The recovery circuitry 50 controls the issue stage 26 to issue the instruction again at step 110. By the time that the instruction reaches the execute stage 28 again then the value of the operand $r_x$ may have become available (if not then a further recovery operation can be performed).

As an alternative to performing the recovery operation by reissuing the instruction, it is possible that the recovery circuitry 50 instead stalls execution of the appropriate one of the execute pipelines 34, 38 until the operand $r_x$ becomes available. In this case then flow will not return to step 110 following the determination at step 118 that $r_x$ is not available and instead will remain at step 118 until $r_x$ has been generated by the preceding instruction.

Figure 3:
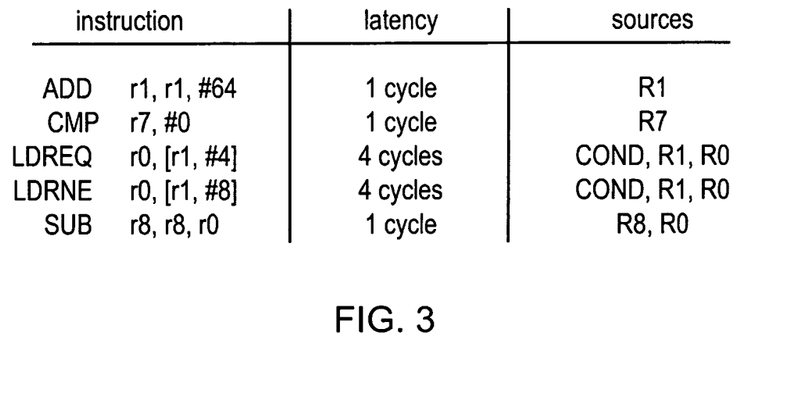
FIG. 3 shows an example sequence of program instructions to be executed.

FIG. 3 shows an example of a sequence of instructions to be processed by the pipeline. The sequence consists of an add instruction (ADD), a compare instruction (CMP), a conditional load instruction (LDREQ) arranged to load a value from memory 8 to a destination register in the event that the result of the compare instruction is that the values being compared are equal, a conditional load instruction (LDRNE) arranged to load a value to a destination register in the event that the compare instruction produces a result indicating that the compared values are not equal, and a subtract instruction (SUB). The add, compare and subtract instruction each require one cycle to execute, whereas the two conditional load instructions each take four cycles to execute.

Figure 4:
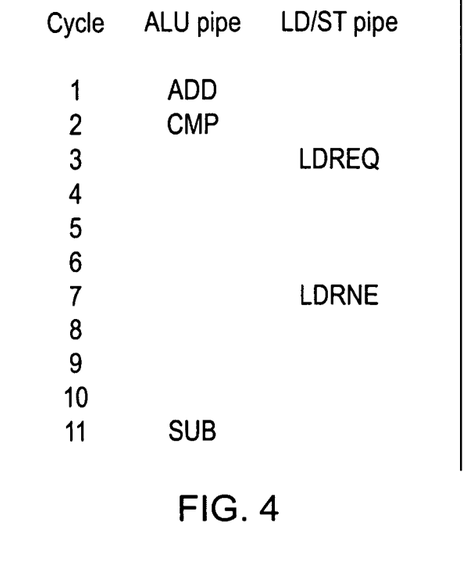
FIG. 4 illustrates a scheduling of the instruction sequence shown in FIG. 3 in which instructions are issued only once all of the source operands are available.

The processing of the conditional load instructions by the pipeline 4 will be described below. Both conditional load instructions specify the same destination register r0. If the condition code of the conditional load instruction is not satisfied then the previous value of the destination register r0 will be retained. This means that the previous value of the destination register is effectively treated as an additional source operand in order to perform a conditional select between the value in the destination register and the value to be loaded to the register if the condition codes are satisfied. For the second of the conditional load instructions (LDRNE), the value stored in the destination register r0 will not be known for certain until after the first of the conditional load instructions (LDREQ) has been executed, and so there is a potential data hazard. In previously known systems, the issue stage 26 would deal with the potential hazard by issuing the second conditional load instruction four cycles after the first conditional load instruction so that the second conditional load instruction will execute after the first conditional load instruction has finished. This is shown in FIG. 4, in which it can be seen that such conservative scheduling will result in the whole sequence of instructions taking 11 cycles to execute.

Figure 5:
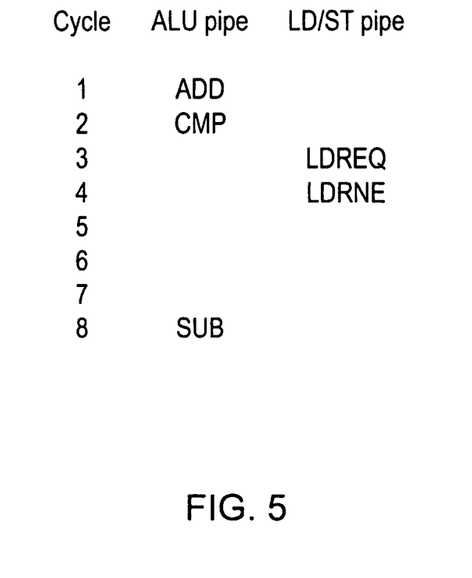
FIG. 5 shows a scheduling of the instruction sequence in which the scheduling latency is reduced by issuing instructions independently of when source operands become available.

In contrast, the present technique recognizes that for the second conditional load instruction LDRNE, if the condition is "not equal" then the value of the destination register r0 will not be required since it will be replaced with a new value (a value loaded from a location in memory 8 having an address calculated by adding the value stored in register r1 to the immediate value #8). Since there is a chance that the value of destination register r0 calculated by the first conditional load instruction LDREQ is not necessary for the second conditional load instruction LDRNE, the issue stage 26 issues the conditional load instructions in successive cycles 3 and 4 as shown in FIG. 5. The issuing of the second conditional load instruction is independent of when the operand associated with register r0 is generated by the preceding instruction. As shown in FIG. 5, the entire sequence of instructions can be executed in eight cycles, three fewer than in FIG. 4. The scheduling latency is thus reduced.

Note that the two conditional load instructions in FIG. 3 have opposite conditions associated with them. This means that there are two possible scenarios, one in which the condition is "equal" and one in which the condition is "not equal". For the "equal" case, the first conditional load instruction satisfies its condition codes and so does not require its r0 operand. A new value for register r0 is loaded from memory 8 (in this example, the location in memory 8 from which the new value is loaded has an address calculated by adding four to the value stored in register r1). The second conditional load instruction fails its condition codes and so does require the r0 operand. If the r0 operand is not ready in time for execution of the second conditional load instruction then a recovery operation will be necessary in order to retrieve the value of the r0 operand before executing the second conditional load instruction.

In the "not equal" case, the first of the conditional load instructions is not executed and does require its r0 operand. However, the second instruction is executed and so does not require its r0 operand. It can complete execution and forward its result to subsequent instructions regardless of what happens to the first of the conditional load instructions. It is in this case that the dynamic scheduling of the present technique results in the greatest reduction in the number of cycles required to process the sequence of instructions.

The example shown in FIGS. 3 to 5 has been discussed above in the context of the r0 operand being the operand $r_x$ (see FIG. 2) that is not required for at least one outcome, with the condition taken outcome of the LDRNE instruction representing the first outcome of FIG. 2 and the condition not taken outcome representing the second outcome. However, since the r1 operand of the second conditional instruction LDRNE is used in one outcome but not in the other outcome then it can also be treated as the operand $r_x$ of FIG. 2 and the issue stage 26 can also issue the instruction in anticipation that the r1 operand may not be needed for execution. If the LDRNE instruction was preceded by an instruction calculating a value for r1 rather than r0 as in FIG. 3 then r1 would be treated as operand $r_x$. If this is the case, then the first outcome of FIG. 2 would be the condition not taken outcome and the second outcome would be the condition taken outcome.

The above examples have been explained with reference to the conditional load instructions executed by the load/store execution pipeline 38. However it will be appreciated that the present technique is applicable to any conditional instruction and so could be used, for example, with conditional add or multiply instructions executed by the ALU execution pipeline 34.

Figure 6:
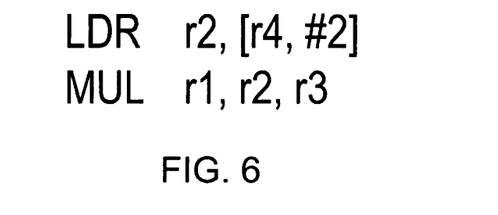
FIG. 6 shows an example of a multiply instruction.

Another example of one of the predetermined types of instruction is a multiply instruction. FIG. 6 shows a multiply instruction that controls the ALU execution pipeline 34 to multiply an operand stored in a register r2 with another operand stored in a register r3. The result of the multiply instruction is then written to a destination register r1 by the write back stage 30. In this example, the multiply instruction follows a load instruction that loads a value to register r2. The multiply instruction has alternative processing outcomes depending on whether or not the value stored in the register specified by r3 is zero. If the operand r3 is zero, then the result of the multiply instruction will be independent of the result of the preceding load instruction since the value will always be zero. On the other hand, if r3 is not zero then the multiply instruction is dependent upon the value of r2. Since there is an outcome of the multiply instruction for which the result of the load instruction is not required, this means that the multiply instruction can be issued in a subsequent processing cycle to the load instruction without waiting for the load instruction to complete, so as to reduce the scheduling latency. On the occasions that the value of operand r3 is zero then the number of processing cycles required can be reduced, while if it turns out that the value of the r2 operand is required for the multiply instruction, then a recovery operation as described above can be performed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus for processing data under control of a sequence of program instructions, said apparatus comprising:
an instruction decoder for decoding said program instructions to generate decoded instructions, said program instructions including a conditional load instruction having a plurality of alternative outcomes, said alternative outcomes including at least a first outcome that is independent of at least one operand and a second outcome that is dependent on said at least one operand, said at least one operand being generated by a preceding instruction of said sequence of program instructions;
instruction issuing circuitry for issuing said decoded instructions for execution, said instruction issuing circuitry configured to issue one of said decoded instructions corresponding to said conditional load instruction independently of when said at least one operand is generated by said preceding instruction;
instruction execution circuitry for executing said decoded instructions issued by said instruction issuing circuitry, wherein said instruction execution circuitry is responsive to said one of said decoded instructions corresponding to said conditional load instruction to load a value from a memory to a destination register if a condition associated with said conditional load instruction is satisfied; and
recovery circuitry for performing a recovery operation in the event that said second outcome is to be executed for said conditional load instruction and said at least one operand has not been generated by said preceding instruction when said one of said decoded instructions corresponding to said conditional load instruction is to be executed by said instruction execution circuitry.

2. The apparatus according to claim 1, wherein said at least one operand is a value stored in said destination register prior to execution of said one of said decoded instructions corresponding to said conditional load instruction.

3. The apparatus according to claim 1, wherein said at least one operand is used to obtain said value to be loaded to said destination register if said condition is satisfied.

4. The apparatus according to claim 1, wherein one of said decoded instructions corresponding to said preceding instruction is executed in a plurality of processing cycles by said instruction execution circuitry.

5. The apparatus according to claim 1, wherein said recovery circuitry is configured to perform said recovery operation by controlling said instruction issuing circuitry to reissue said one of said decoded instructions corresponding to said conditional load instruction.

6. The apparatus according to claim 1, wherein said recovery circuitry is configured to perform said recovery operation by stalling execution of said decoded instructions by said instruction execution circuitry until said at least one operand has been generated by said preceding instruction.

7. The apparatus according to claim 1, wherein said apparatus is an out-of-order processor and said instruction issuing circuitry is configured to schedule an execution order of said sequence of program instructions dynamically.

8. The apparatus according to claim 1, wherein said program instructions include register specifiers for identifying registers, said at least one operand being a value stored in a register specified by at least one of said register specifiers.

9. The apparatus according to claim 1, wherein, if said first outcome is to be executed and said at least one operand has not been generated by said preceding instruction when said one of said decoded instructions corresponding to said conditional load instruction is to be executed by said instruction execution circuitry, then said instruction execution circuitry is configured to execute said one of said decoded instructions corresponding to said conditional load instruction without said recovery circuitry performing said recovery operation.

10. A method for processing data under control of a sequence of program instructions, said method comprising steps of:
decoding said program instructions to generate decoded instructions, said program instructions including a conditional load instruction having a plurality of alternative outcomes, said alternative outcomes including at least a first outcome that is independent of at least one operand and a second outcome that is dependent on said at least one operand, said at least one operand being generated by a preceding instruction of said sequence of program instructions;
issuing said decoded instructions for execution, one of said decoded instructions corresponding to said conditional load instruction being issued independently of when said at least one operand is generated by said preceding instruction;

executing said decoded instructions issued in said issuing step, wherein in response to said one of said decoded instructions corresponding to said conditional load instruction, said executing step loads a value from a memory to a destination register if a condition associated with said conditional load instruction is satisfied; and performing a recovery operation in the event that said second outcome is to be executed for said conditional load instruction and said at least one operand has not been generated by said preceding instruction when said one of said decoded instructions corresponding to said conditional load instruction is to be executed by said executing step.

11. The method according to claim 10, wherein said at least one operand is a value stored in said destination register prior to execution of said one of said decoded instructions corresponding to said conditional load instruction.

12. The method according to claim 10, wherein said at least one operand is used to obtain said value to be loaded to said destination register if said condition is satisfied.

13. The method according to claim 10, wherein one of said decoded instructions corresponding to said preceding instruction is executed in a plurality of processing cycles in said executing step.

14. The method according to claim 10, wherein said recovery operation comprises reissuing said one of said decoded instructions corresponding to said conditional load instruction.

15. The method according to claim 10, wherein said recovery operation comprises stalling execution of said decoded instructions by said executing step until said at least one operand has been generated by said preceding instruction.

16. The method according to claim 10, wherein said issuing step schedules an execution order of said sequence of program instructions dynamically.

17. The method according to claim 10, wherein said program instructions include register specifiers for identifying registers, said at least one operand being a value stored in a register specified by at least one of said register specifiers.

* * * * *